(12) United States Patent
Vaghini et al.

(10) Patent No.: US 7,777,150 B2
(45) Date of Patent: Aug. 17, 2010

(54) THREE-POLE APPARATUS FOR A MEDIUM OR HIGH VOLTAGE CUBICLE AND ASSOCIATED CUBICLE COMPRISING SUCH A THREE-POLE APPARATUS

(75) Inventors: Alberto Vaghini, Piacenza (IT); Armando Rossi, Alatri (FR); Giorgio Perli, Bergamo (IT)

(73) Assignee: Vei T&D S.R.L., Guardamiglio Lo (IT)

( * ) Notice: Subject to any disclaimer, the term of this patent is extended or adjusted under 35 U.S.C. 154(b) by 461 days.

(21) Appl. No.: 11/937,765

(22) Filed: Nov. 9, 2007

(65) Prior Publication Data
US 2008/0110738 A1 May 15, 2008

(30) Foreign Application Priority Data
Nov. 10, 2006 (IT) .......................... MI2006A2161

(51) Int. Cl.
*H01H 33/14* (2006.01)
(52) U.S. Cl. .............................. 218/44; 218/9; 218/152
(58) Field of Classification Search ...................... 218/7, 218/9–14, 44–47, 67, 78–80, 84, 119, 120, 218/140, 152–154
See application file for complete search history.

(56) References Cited
U.S. PATENT DOCUMENTS
3,814,883 A * 6/1974 Milianowicz ................ 218/85
5,357,068 A * 10/1994 Rozier .......................... 218/44

FOREIGN PATENT DOCUMENTS
EP 0 543 683 5/1993
EP 1 226 596 1/2003

OTHER PUBLICATIONS
European Search Report for IT MI20062161 mailed Apr. 12, 2007.

\* cited by examiner

*Primary Examiner*—T C Patel
*Assistant Examiner*—Marina Fishman
(74) *Attorney, Agent, or Firm*—Nixon & Vanderhye, P.C.

(57) ABSTRACT

A three-pole apparatus, configured to be installed in a cubicle of an electric substation, comprises an air-insulated three-pole disconnector and a three-pole circuit breaker. The air-insulated three-pole disconnector is configured to isolate an electric line leaving the cubicle. The three-pole circuit breaker is configured to perform line protection functions. The three-pole apparatus comprises a casing comprised of insulating material and internally housing, at least partially, the three-pole circuit breaker. The casing is not sealingly closed and contains air. The circuit breaker comprises three vacuum circuit-breaker modules; the disconnector comprises three single-pole disconnector devices. Each of the single-pole disconnector devices in turn comprises a contact movable linearly from a service position into a disconnection position. Each of the contacts, when it is in its service position, projects at least partially from the casing. The three-pole apparatus is configured for cooperating with an earthing switch which is not enclosed into the casing.

14 Claims, 6 Drawing Sheets

THREE-POLE APPARATUS FOR A MEDIUM OR HIGH VOLTAGE CUBICLE AND ASSOCIATED CUBICLE COMPRISING SUCH A THREE-POLE APPARATUS

BACKGROUND OF THE INVENTION

This application is based on Application No. MI2006A 002161 filed in Italy on Nov. 10, 2006, the content of which is incorporated hereinto by reference.

The present invention relates to a three-pole electric apparatus, in particular for medium or high voltage electric sub-stations. For each pole, the apparatus comprises an air-insulated disconnector able to perform line isolating functions and a circuit-breaker using the technique of vacuum circuit-breaking in order to perform line protection functions. The apparatus according to the invention is suitable for installation in cubicles of the protected type which form medium or high voltage electric switchboards. These cubicles also contain an air-insulated earthing switch able to perform line earthing functions.

As is known, an electric switchboard represents all the electrical apparatus situated in a node of the electrical network, the purpose of which is to transmit or concentrate the electric power in order to allow efficient transportation and/or distribution thereof. Generally, in a node there are one or more lines which converge there and several lines which depart therefrom. Generally, the regulations for medium and high voltage apparatus envisage that, in a node of the network, each incoming and outgoing line is provided with apparatus which perform isolating and earthing functions (to ensure safety) and a protective function (to allow the elimination of faults which may arise).

A circuit breaker is able to protect the line leaving the node and directed towards the user. A disconnector, after the circuit breaker has opened the line leaving the node and directed towards a user, is able to disconnect physically this line. Finally, an earthing switch, provided that the disconnector has disconnected the line from the node which supplies or receives the voltage, earths the line so as to allow the operator to access in complete safety the conductors which are normally live. All of the abovementioned devices, situated in a node of the network, in addition to other devices not relevant for the purposes of the present invention, present in an electric power distribution node, are generally referred to by the term "switchboard". Each switchboard is composed of several cubicles inside which the circuit-breaking, isolating and earthing functions for each line are performed.

EP 1,226,596 in the name of the same Applicant describes a three-pole apparatus for electric substations which has an extremely compact structure compared to the known apparatus. The device according to EP 1,226,596 comprises a series of isolators which contain at least one disconnector, a circuit breaker and an earthing switch. The circuit breaker is sealed inside a vacuum bulb and is positioned in series with a line-earth disconnector device which is movable between a first position where it connects said circuit breaker to a contact of the voltage busbars and a second position where it connects the circuit breaker to an earth contact. According to EP 1,226,596, the line-earth disconnector and the circuit breaker are all contained inside a metal casing and the isolators are arranged at the input and output terminals of the device.

The abovementioned known device is extremely compact, efficient, safe and reliable. However, the Applicant has set itself the aim of providing a three-pole apparatus, typically for a medium or high voltage cubicle, comprising, for each pole of the apparatus, a disconnector able to perform line isolating functions and a circuit breaker able to perform circuit-breaking functions, which apparatus can be easily extracted from the cubicle in complete safety by the maintenance personnel. Rapidity and ease of extraction are of primary importance for keeping the intervention times to a minimum. Safety for the operators is also an indispensable feature for this type of apparatus.

EP 0 543 683 discloses a multipole load break switch comprising, for each pole, an insulating bushing enclosing an evacuated bulb, the bushing including at a first end a first contact connected to a first terminal of the bulb and intended to cooperate with a first conductor, and at a second end a second contact connected to a second terminal of the bulb and intended to cooperate with a second conductor, the bushings being integral with a common metal section shrouding a common shaft for operating the bulbs and which is actuated by a mechanism contained in a cabinet integral with the section.

SUMMARY OF THE INVENTION

According to a first aspect, a three-pole apparatus to be installed in a cubicle of an electric substation is provided. The apparatus comprises:

i) an air-insulated three-pole disconnector configured for performing functions of isolating an electric line leaving the cubicle, and ii) a three-pole circuit breaker configured for performing line protection functions. The apparatus is characterized in that:

a) it further comprises a casing which is made of insulating material and houses internally, at least partially, said three-pole circuit breaker;

b) the three-pole circuit breaker comprises three vacuum circuit-breaker modules and the three-pole disconnector comprises three single-pole disconnector devices, wherein each of the single-pole disconnector devices in turn comprises a contact which is movable linearly from a service position into a disconnection position;

c) wherein each of the contacts, when it is in its service position, projects at least partially from the casing; and d) the three-pole apparatus is configured for cooperating with an earthing switch which is not enclosed into said casing.

Advantageously, the casing is not sealingly closed (differently from prior art apparatus EP 1 226 596) and contains air (differently from prior art apparatus of EP 1 226 596 containing $SF_6$). The casing could be opened and repaired, if needed. In addition, no pollution into the environment is caused.

Thanks to feature c), when the apparatus has to be extracted from the cubicle, the operator safely knows whether the apparatus is in the isolating (disconnected) position or in the service position. Thanks to feature c), means could be provided into the cubicle for preventing the extraction of the apparatus when the contacts of the disconnector are in the extended configuration (service position).

The apparatus, preferably, further comprises a shaft for actuating the isolating devices, wherein the isolating device actuating shaft is supported, directly or indirectly, by the casing. The apparatus also preferably comprises a shaft for actuating the vacuum circuit-breaker modules, wherein the vacuum circuit-breaker module actuating shaft is supported, directly or indirectly, by the casing.

In one embodiment, the vacuum circuit-breaker module actuating shaft is arranged outside from said casing.

In one embodiment, the axis of each of said movable contacts of single-pole disconnector device coincides with the axis of a respective vacuum circuit-breaker module.

Preferably, the axis of each of said movable contacts of single-pole disconnector device is substantially vertical.

In one embodiment, the three-pole disconnector comprises three guide tubes, each guide tube being configured to guide a respective contact of the three movable contacts.

In one embodiment, each guide tube has at least one guiding groove formed therein for guiding a pin passing through a respective movable contact, the movement of said pin being controlled by a link rod/crank assembly operated by said shaft actuating the single-pole isolating devices.

In one embodiment, the apparatus comprises a system of levers, actuated by said shaft for actuating the vacuum circuit breaker modules, which operates movable contacts of the vacuum circuit-breaker module.

According to a second aspect, the present invention provides a cubicle of a medium or high voltage electric substation comprising support guides by means of which at least one three-pole apparatus can be introduced, extracted or held in position. The three-pole apparatus comprises an air-insulated three-pole disconnector which is configured for performing functions of isolating the electric line leaving the cubicle; a three-pole circuit breaker which is configured for performing line protection functions; and a casing which is made of insulating material and houses internally, at least partially, said three-pole circuit breaker. The three-pole circuit breaker comprises three vacuum circuit-breaker modules and the three-pole disconnector comprises three single-pole disconnector devices, each of the single-pole disconnector devices in turn comprising a contact movable linearly from a service position into a disconnection position. Each of the contacts, when it is in its service position, projects at least partially from the casing. The three-pole apparatus is configured for cooperating with an earthing switch which is not enclosed into said casing.

The cubicle also preferably comprises a partition between voltage busbars and the three-pole apparatus, the partition having an opening through which the movable contacts of the three-pole disconnector can pass.

The cubicle also preferably comprises a separating shutter movable between a first open position where it allows the movable contacts of the three-pole disconnector to pass through and a second position where it closes the opening.

The movement of said separating shutter is preferably dependent upon the position of the movable contacts of the three-pole disconnector. As an alternative, it is dependent on the presence or absence of a panel for closing said cubicle.

The cubicle also preferably comprises an earthing switch with an arm rotatable from a service position into an earthing position.

The cubicle also preferably comprises a shaped plate electrically insulated from the cubicle, said shaped plate being connected to user line cables and to clamping terminals electrically connected to the three-pole apparatus.

BRIEF DESCRIPTION OF THE DRAWINGS

The present invention will become entirely clear from the detailed description which follows, provided purely by way of a non-limiting example, to be read with reference to the annexed sets of illustrative drawings in which.

DETAILED DESCRIPTION

The various FIGS. 2-6 show schematically a three-pole apparatus 1 according to an embodiment of the present invention. In particular, FIGS. 2-6 show the apparatus 1 in the form of side views where it is assumed that the cubicle 2 inside which it is contained is open. For the sake of convenience of illustration, moreover, the casing made of insulating material and described below is shown cross-sectioned so that all the components housed inside it are visible.

Figure 1:
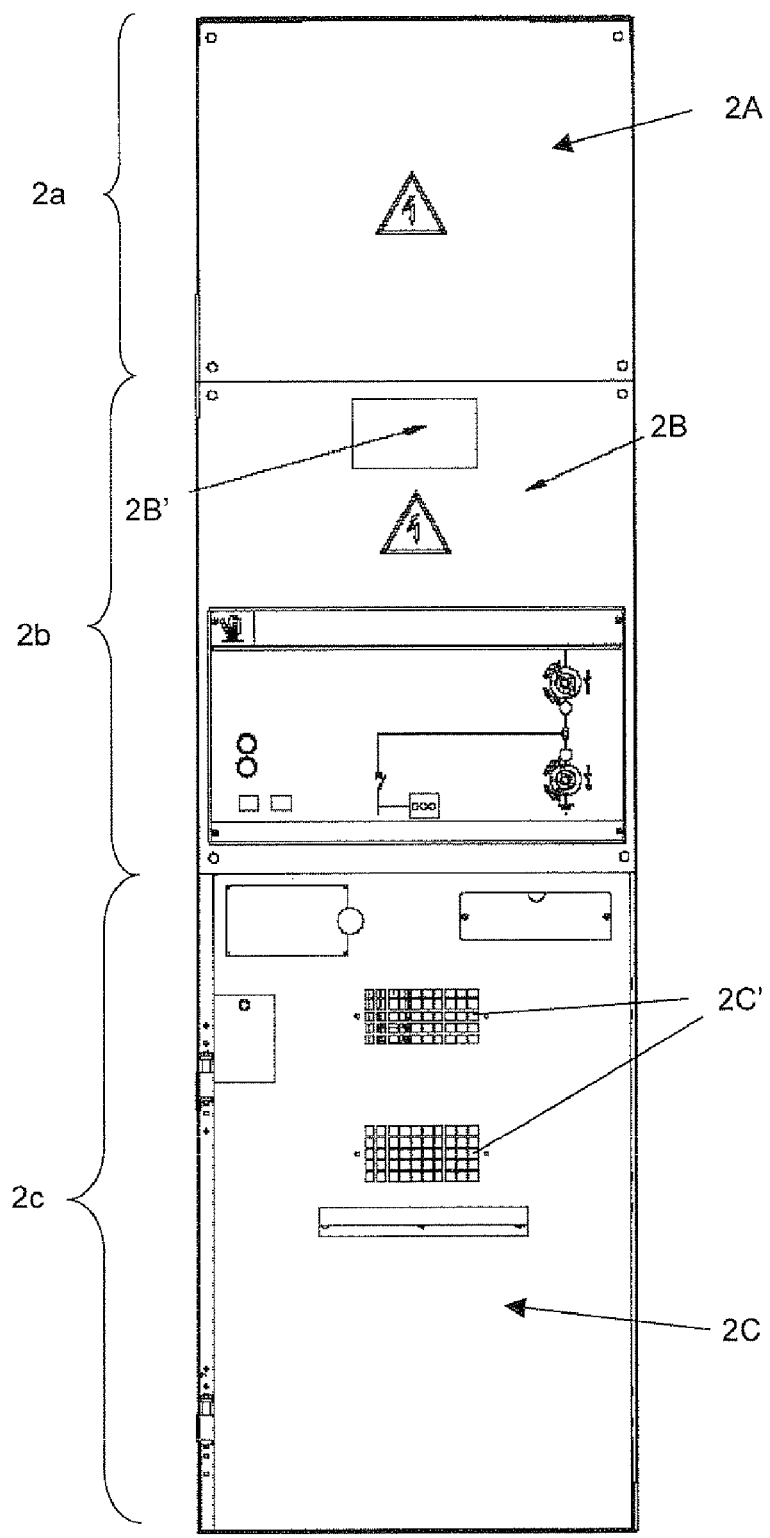
FIG. 1 is a schematic front view of a closed cubicle able to house an apparatus according to an embodiment of the invention.
Figure 2:
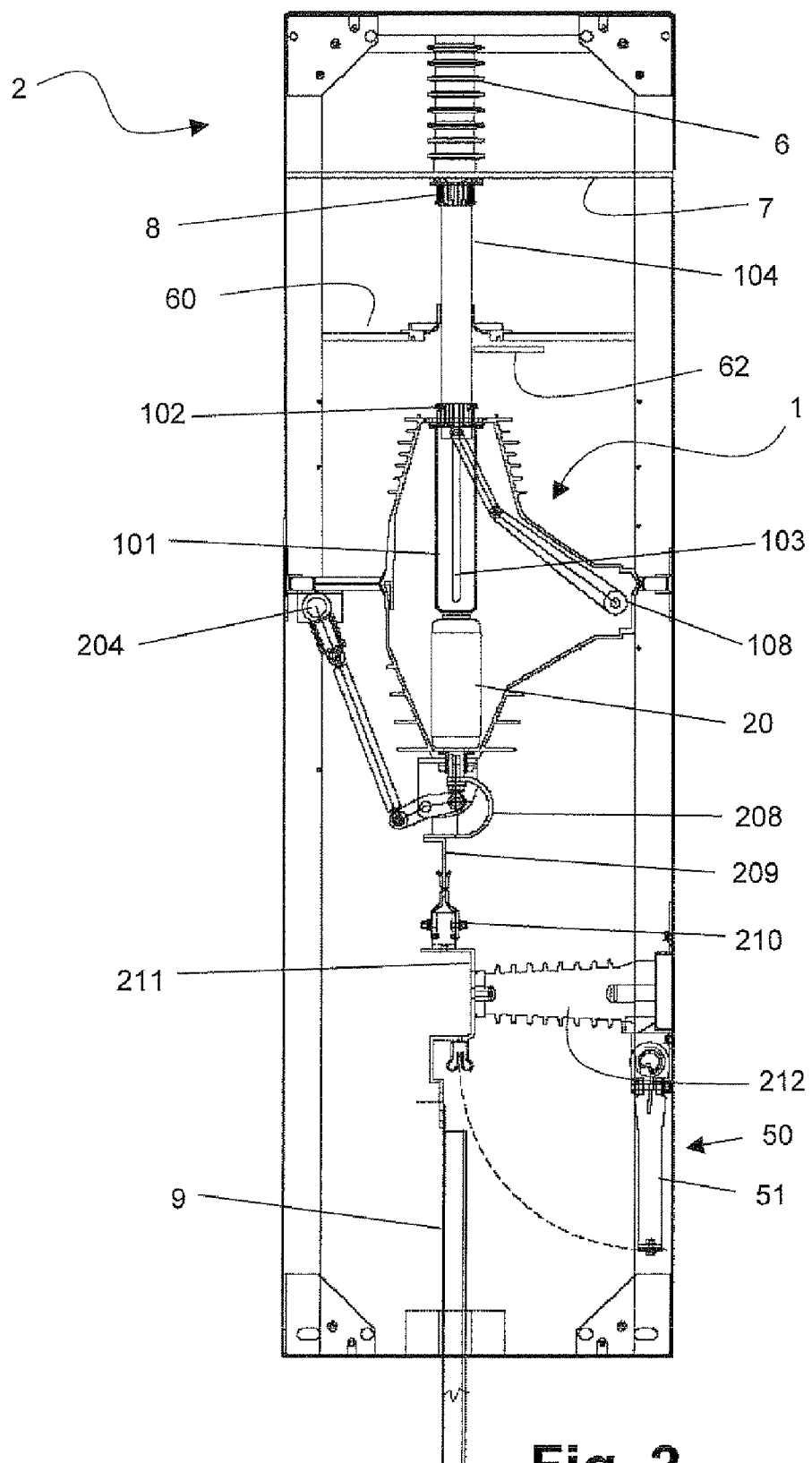
FIG. 2 shows the apparatus according to an embodiment of the invention, where the apparatus is arranged inside a cubicle and is in the service position.
Figure 3:
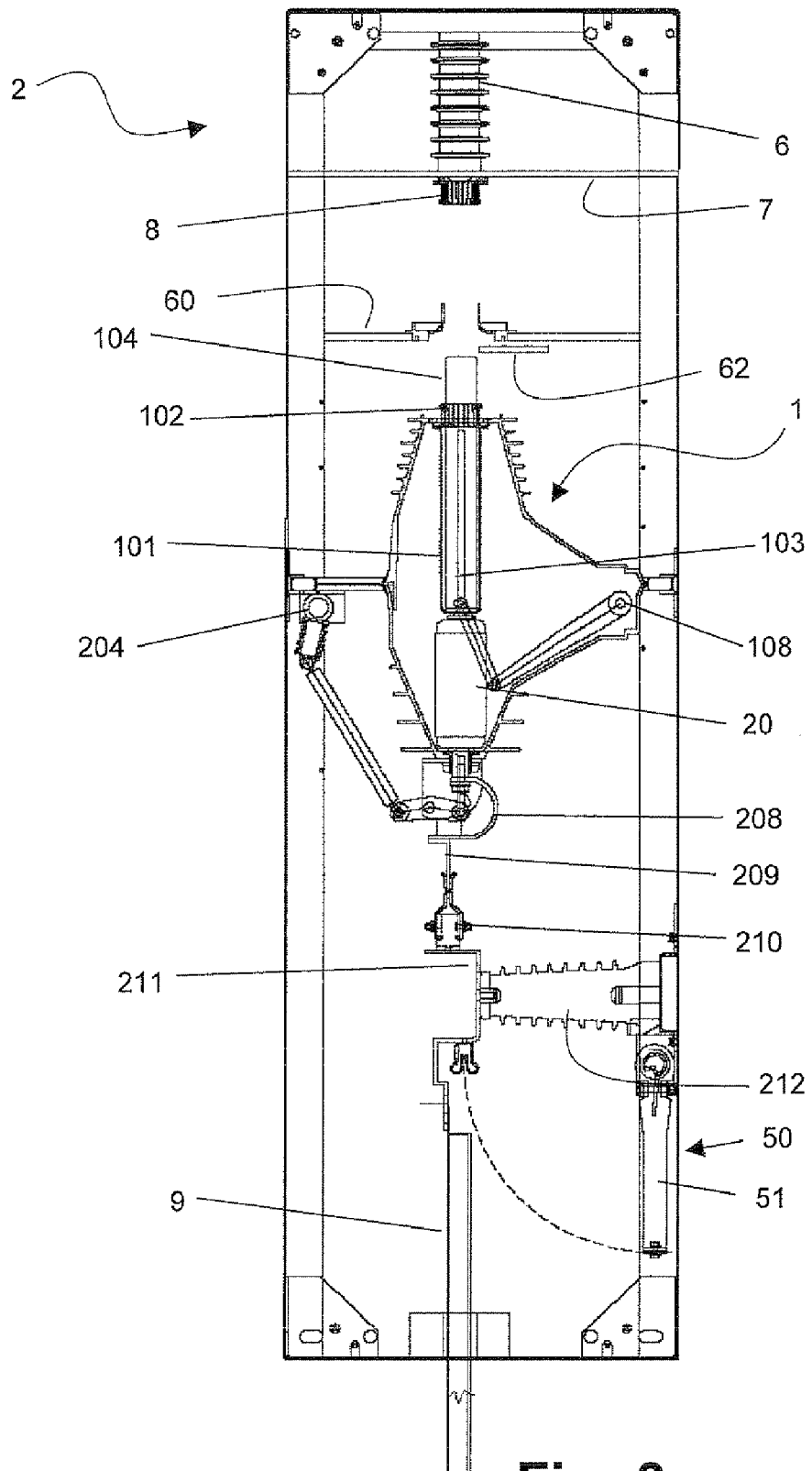
FIG. 3 shows the apparatus according to an embodiment of the invention, where the apparatus is arranged inside a cubicle and is in the disconnected position.
Figure 4:
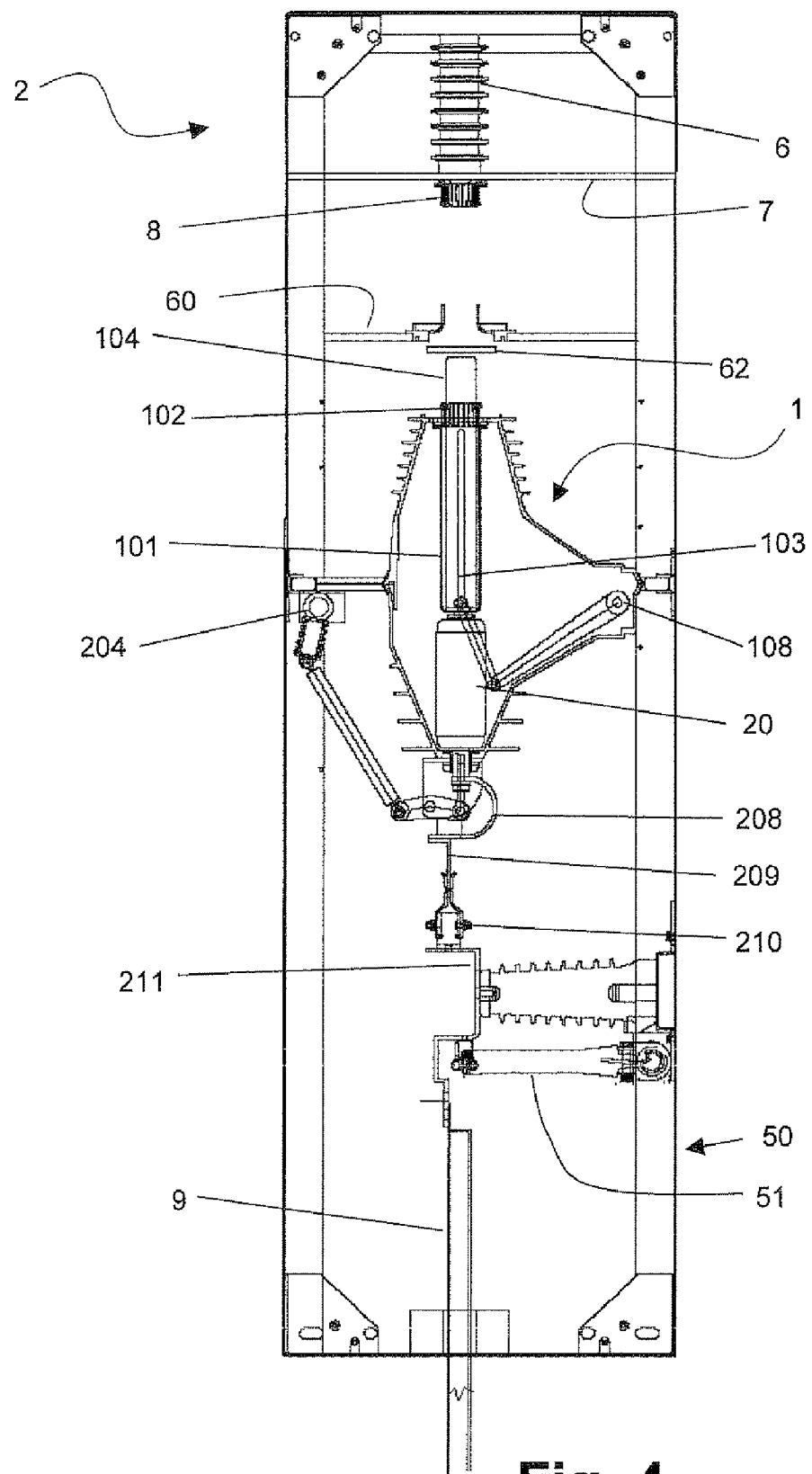
FIG. 4 shows the apparatus according to an embodiment of the invention, where the apparatus is arranged inside a cubicle and is in the earthing position with the shutter closed.

A metal cubicle 2, which is suitable for housing the three-pole apparatus 1 according to the invention, is shown closed in FIG. 1 and open in FIGS. 2-4. The cubicle 2 is box-shaped. In an advantageous embodiment, three different zones are identified inside the cubicle 2: an upper zone 2a, also called "busbar cell", a middle zone 2b, also called "apparatus cell", and a bottom zone 2c, also called "cable cell". Conveniently, the busbar cell 2a is closed by an upper panel 2A. The upper panel 2A may be bolted, or otherwise fixed, to the walls of the cubicle 2. Conveniently, the middle zone 2b is closed by a middle panel 2B. The middle panel 2B may be bolted, or otherwise fixed, to the walls of the cubicle 2. The middle panel 2B has an inspection port 2B' which is closed by a sheet of transparent material such as glass or plexiglass. Conveniently, the cable cell 2c is closed by a door 2C hinged to one of the walls of the cubicle 2. It is possible to provide, in the door of the cable cell 2c, one or more inspection windows 2C' for checking the position of the earthing switch.

Inside the cubicle 2, the three-pole apparatus 1 is supported by a C-shaped guide 3 (visible more clearly in the enlarged FIGS. 5 and 6) which is fixed to the walls of the cubicle 2 at a suitable height. The apparatus 1 is situated substantially in the middle zone of the cubicle 2.

The roof of the cubicle 2 has, projecting from it, three insulating supports 6 which support three respective main medium or high voltage busbars 7. The three busbars 7 pass through the cubicle 2 transversely. Since this consists of a front view of the cubicle, only one main busbar 7 and one insulating support 6 are shown. Each main busbar 7 is fixed to its support 6 via a line contact member 8, which is preferably a tulip contact surrounded by a spring.

The three-pole apparatus comprises a disconnector and a circuit breaker. The disconnector comprises three single-pole isolating devices and the circuit breaker comprises three vacuum circuit-breaker modules 20. In this way, for each pole, the three-pole apparatus 1 comprises a single-pole isolating device 10 which is linearly actuated and a vacuum circuit-breaker module 20. The vacuum circuit-breaker modules 20 are contained, at least partially, inside a casing 30 made of insulating material (for example epoxy resin or the like). The casing 30 may conveniently consist of two parts: an upper bell and a lower bell. Preferably, the casing 30 is at least partly finned externally so as to increase the flow-off lines. The casing 30 is, preferably, not sealingly closed and therefore contains air inside it. In any case, it forms a protected atmosphere.

One of the three single-pole isolating devices 10 of the three-pole apparatus 1 according to the invention will now be described.

The single-pole isolating device 10 comprises a guide tube 101 which acts as a field diffuser. The bottom end of the guide tube 101 is in electrical contact with the top end of a respective circuit breaker 20; the top end of the guide tube 101 is instead in electrical contact with a tulip contact 102. The guide tube 101 is made of electrically conductive material, conveniently aluminium or aluminium alloy.

The guide tube 101 preferably has a circular cross-section. Two longitudinal grooves 103, which are situated radially opposite each other, are formed in the guide tube 101. For this reason, only one groove 103 is visible in the figures.

A movable line isolating contact 104 slides inside the guide tube 101. The movable contact 104 also has a preferably cylindrical cross-section. It may be conveniently hollow. Conveniently, the movable contact 104 may be made of copper or aluminium. When the apparatus is in the service position (FIG. 2), the movable contact 104 is completely extracted and its top end is in contact with the line contact member 8.

Figure 5:
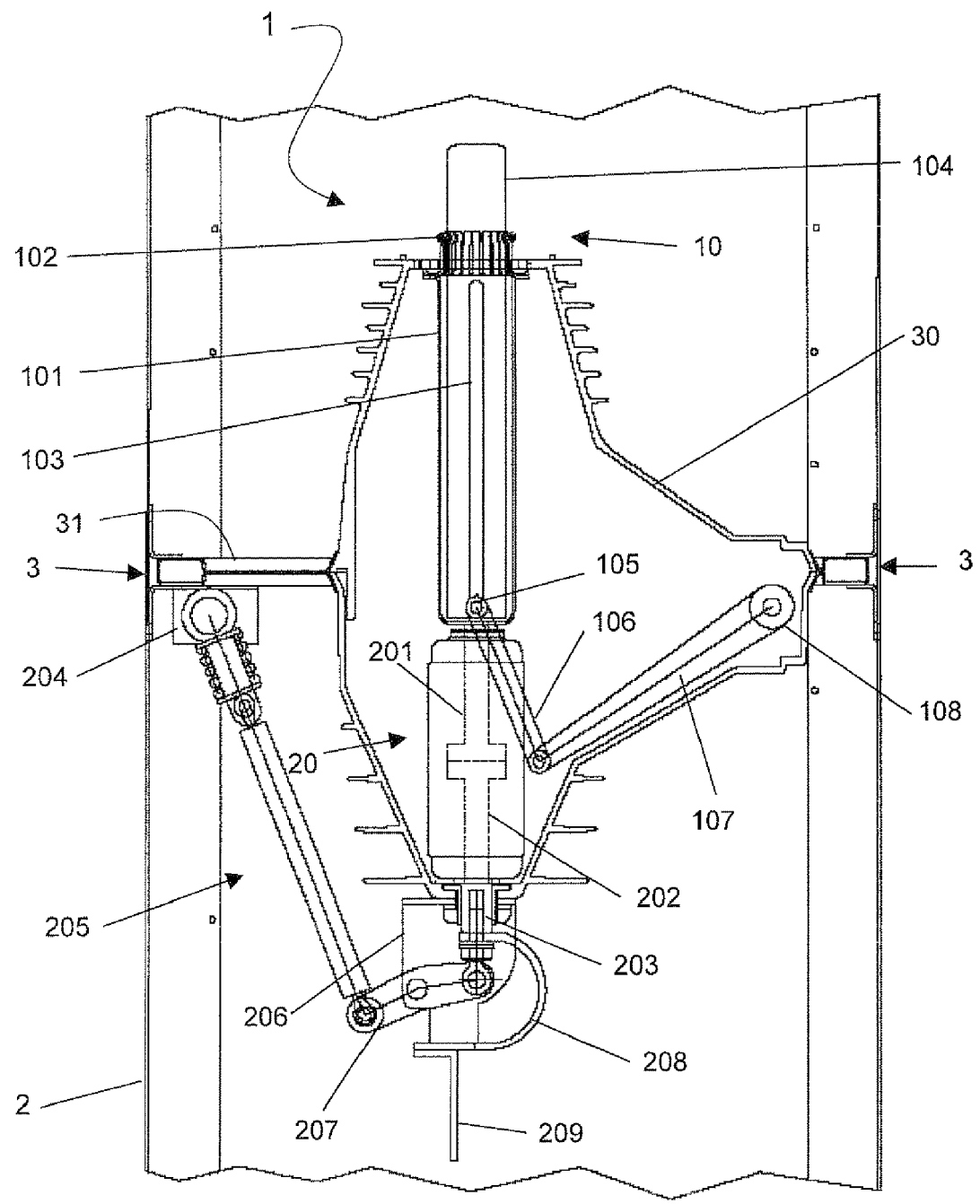
FIG. 5 shows the apparatus according to an embodiment of the invention and shows only part of the cubicle inside which the apparatus is housed; in this figure the circuit breaker is schematically shown in the closed position.
Figure 6:
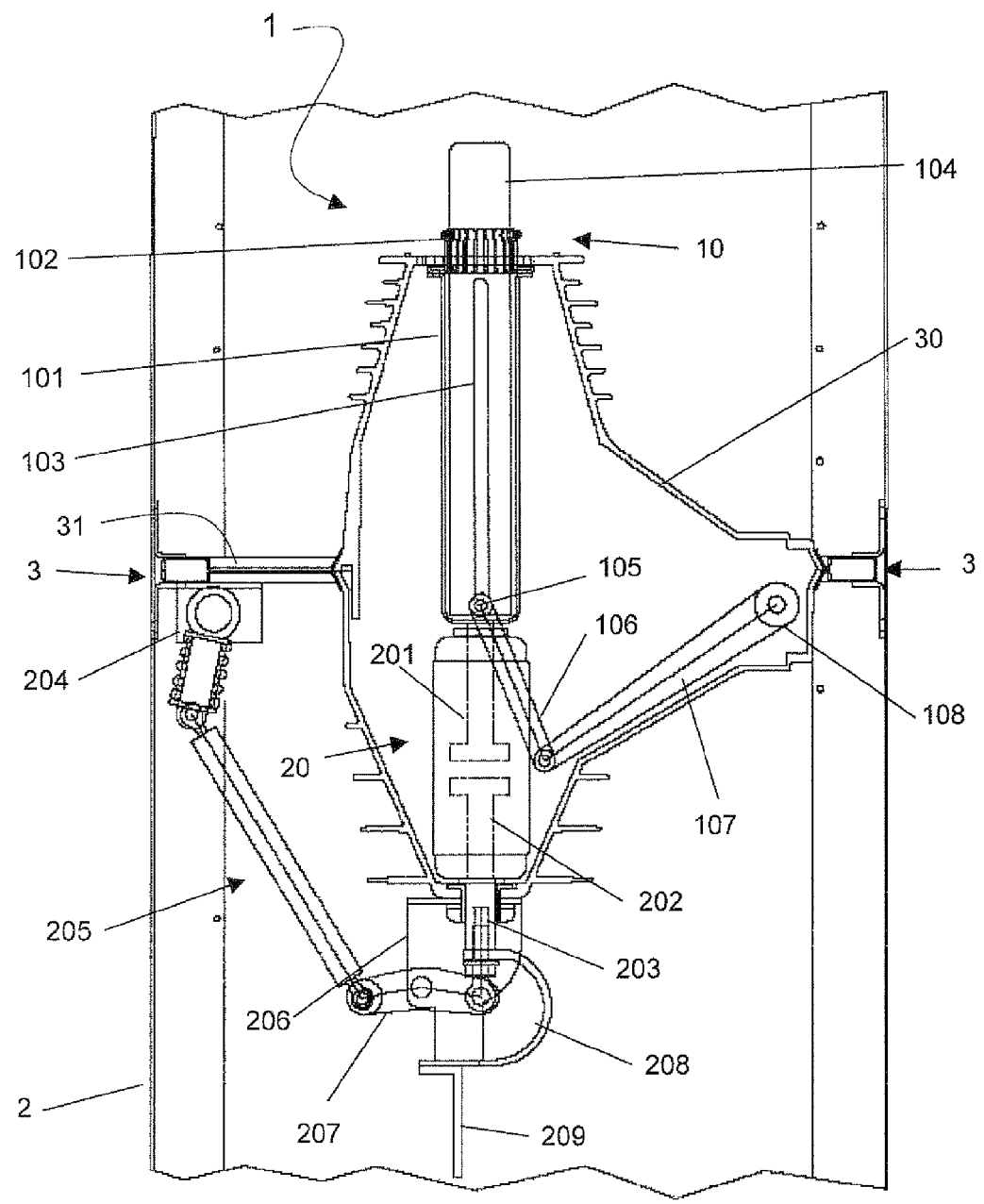
FIG. 6 shows the apparatus according to an embodiment of the invention and shows only part of the cubicle inside which the apparatus is housed; in this figure the circuit breaker is schematically shown in the open position.

The bottom part of the movable contact 104 is passed through by a pin 105 (FIGS. 5 and 6). The pin 105 is guided inside the longitudinal grooves 103. In this way it performs a vertical displacement (and causes the movable contact 104 to perform a similar vertical displacement). Each end of the pin 105 is pivotably mounted on an isolating link rod 106. In turn, each link rod 106 of a single-pole isolating device is pivotably mounted on a crank 107 of a single-pole isolating device. The cranks 107 are rigidly connected to a shaft 108 of a single-pole isolating device. Conveniently, the link rods and cranks are made of an electrically insulating material.

According to the present invention a single isolating shaft is provided for simultaneously actuating the three single-pole isolating devices of the disconnector. With reference to FIGS. 2 and 3, by rotating the isolating shaft 108 in an anti-clockwise direction, the three movable contacts 104 of the three single-pole isolating devices 10 are displaced downwards, passing from the service position (FIG. 2) into the isolating position (FIG. 3). The casing 30 made of insulating material is conveniently shaped so as to have an upper wall inclined in the manner of the link rods 107 of the single-pole isolating device in their service position and a bottom wall inclined in the manner of the link rods 107 of the single-pole isolating device in their isolating position.

The link rods of all three single-pole isolating devices are therefore rigidly fastened to the shaft 108. In other words, its rotation actuates simultaneously the three single-pole isolating devices of the disconnector. The shaft 108 may be made to rotate by means of known control devices which will not be further described. In any case, according to the present invention, the isolating shaft 108 is supported by the casing 30.

As mentioned above, the three-pole apparatus 1 according to the invention has a circuit breaker comprising three vacuum circuit-breaker modules 20. According to an advantageous embodiment of the invention, each vacuum circuit-breaker module 20 is vertical or in any case in axial alignment with the respective movable isolating contact 104, as shown in the various FIGS. 2-6. A single vacuum circuit-breaker module 20 will be described hereinbelow.

The bottom end of the guide tube 101, as mentioned above, is in contact with the fixed contact 201 of the vacuum circuit-breaker module. The fixed contact 201 of a vacuum circuit-breaker module and the movable contact 202 of the vacuum circuit-breaker module are shown schematically in FIGS. 5 and 6. The movable contact 202 of the vacuum circuit-breaker module is fixed to an end-piece 203 projecting at the bottom from the casing 30.

A single circuit-breaker shaft 204 causes opening and closing of the three vacuum circuit-breaker modules 20 of the circuit breaker, separating or establishing contact between the movable contacts 202 and the fixed contacts 201. The shaft 204 of the circuit breaker is supported directly by the casing 30 made of insulating material. Alternatively, it is supported by a plate 31 which in turn forms a support for the insulating casing 30 and which is in turn supported by the C-shaped guides of the cubicle.

A system of levers 205 causes compression of the contacts, i.e. moves the movable contacts 202 towards the fixed contacts 201. In the embodiment shown, a bracket 206, which is rigidly fastened to the casing 30, supports rotatably a lever 207, one end of which acts on the projecting end-piece 203. In FIG. 5 the circuit breaker 20 is in the closed position, while in FIG. 6 the circuit breaker is in the open position (the fixed and movable contacts are separated).

The bottom end-piece 203 is fixed to conductive braiding 208 which is in turn fixed to a contact plate 209. The contact plate 209 is retained inside a clamping terminal 210 fixed to a shaped plate 211. The shaped plate 211 is supported by an insulating body 212 fixed to a wall of the cubicle 2 and is in electrical contact with the cables 9 which convey current to the user.

An earthing switch 50 is present inside the cubicle 2. Conveniently, an earthing switch 50 is envisaged for each three-pole apparatus. In one embodiment, the earthing switch 50 comprises an isolating arm 51 which is hinged with a wall of the cubicle 2 as shown in FIGS. 2, 3 and 4. In the service position (FIG. 2) or in the line isolating position (FIG. 3), the isolating arm 51 is arranged next to the wall of the cubicle 2. In the earthing position (FIG. 4), the free end of the isolating arm 51 engages with the shaped plate 211.

According to an advantageous embodiment of the invention, a partition 60 is provided between the busbars 7 and the apparatus 1. The partition 60 has three openings 61 (only one of which is shown in the various figures) for allowing the movable contacts 104 of the disconnector to pass through. The openings 61 have an isolating and guiding function. As an alternative to the three openings 61, a single suitably shaped opening 61 may be provided.

In a very advantageous embodiment, a separating shutter 62 for closing the openings 61 is also preferably envisaged. It is possible to envisage three separate shutters which are connected together or a single separating shutter for closing the three openings.

In one embodiment of the invention, the separating shutter 62 moves into the position for closing the openings when the movable contacts 104 are completely below the partition 60 and the earthing switch 50 moves from the open position into the closed position.

In another embodiment, the separating shutter 62 moves into the closed position when, after isolating the movable contacts 104 and positioning the earthing switch 50 in the earth position, the screws of the panel 2B are unbolted in order to allow extraction of the three-pole apparatus 1. Obviously, the inspection port 2B' mentioned above is used by the personnel in order to check the position of the movable isolating contacts 104.

In any case, owing to the partition 60 and the separating shutter 62, the busbars 7 are completely separated and contact with them—even accidentally—is not possible when personnel are working on the apparatus in order to replace or repair it.

According to the present invention, the three-pole apparatus 1 may be easily installed inside a cubicle 2 or removed from it. In fact, both the circuit breaker shaft 204 and the isolating shaft 108 are supported by the casing 30 made of insulating material or by a structure fixed to it (such as, for example, the plate 31). Moreover, the single-pole isolating/disconnector devices 10 are slidable linearly. Moreover, at the bottom, the apparatus has for each pole a plate 209 retained by a clamping terminal 210. In the position suitable for extraction (FIG. 4), the three-pole apparatus 1 may be made to slide along the C-shaped guides 3 and extracted from the cubicle 2, without having to disassemble anything. The operation requires a minimum amount of effort, also because of the relatively compact dimensions of the apparatus 1, and is performed in a few seconds, i.e. merely the time needed to open the bottom door, unscrew the screws of the middle panel and pull out the apparatus in the manner of a drawer. The apparatus may be extracted only in the isolated, shutter closed, circuit breaker open and earthed position. The configuration suitable for extraction is shown in FIG. 4.

Starting from the service position of FIG. 2, when the apparatus has to be extracted, the contacts of the circuit breaker are separated; the contacts 104 are moved from the position of FIG. 2 to the one of FIG. 3. Profitably, the shutter is moved to close the respective opening. Finally, the arm 51 is rotated so that it is moved to the earthing position (FIG. 4) wherein the free end of the isolating arm 51 engages with the shaped plate 211. This measure increases the safety for the personnel in that busbars 7 become completely separated and contact with them—even accidentally—is not possible.

Personnel who has to extract the apparatus can immediately verify that the disconnector is in the isolated position by looking to the length of contacts outside from the casing. In any case, if the contacts are in the service position, the apparatus can not be extracted because the such contacts are within corresponding holes or apertures in the partition.

Mounting of the apparatus according to the invention is likewise performed in a very simple and rapid manner: the apparatus 1 is inserted into the cubicle 2, causing it to slide inside the C-shaped guides 3, and then the middle panel 2B and the bottom door 2C are closed and screwed down again. The apparatus 1 according to an embodiment of the invention is shown in an enlarged view in FIGS. 5 and 6, already mentioned above.

The invention claimed is:

1. A three-pole apparatus to be installed in a cubicle of an electric substation, comprising:
    an air-insulated three-pole disconnector configured for performing functions of isolating an electric line leaving the cubicle,
    a three-pole circuit breaker configured for performing line protection functions,
    a casing comprised of insulating material and at least partially internally housing said three-pole circuit breaker, wherein said casing is not sealingly closed and contains air;
    wherein the three-pole circuit breaker comprises three vacuum circuit-breaker modules and the three-pole disconnector comprises three single-pole disconnector devices, wherein each of the single-pole disconnector devices in turn comprises a contact movable linearly from a service position into a disconnection position;
    wherein each of the contacts, when it is in its service position, projects at least partially from the casing; and
    wherein the three-pole apparatus is configured for cooperating with an earthing switch which is not enclosed into said casing.

2. The apparatus according to claim 1, wherein
    the apparatus further comprises a shaft for actuating the isolating devices, wherein the isolating device actuating shaft is supported, directly or indirectly, by the casing; and
    the apparatus also comprises a shaft for actuating the vacuum circuit-breaker modules, wherein the vacuum circuit-breaker module actuating shaft is supported, directly or indirectly, by the casing.

3. The apparatus according to claim 2, wherein the vacuum circuit-breaker module actuating shaft is arranged outside from said casing.

4. The apparatus according to claim 1, wherein the axis of each of said movable contacts of single-pole disconnector device coincides with the axis of a respective vacuum circuit-breaker module.

5. The apparatus according to claim 1, wherein the axis of each of said movable contacts of single-pole disconnector device is substantially vertical.

6. The apparatus according to claim 1, wherein said three-pole disconnector comprises three guide tubes, each guide tube being configured to guide a respective contact of the three movable contacts.

7. The apparatus according to claim 4, wherein each guide tube has at least one guiding groove formed therein for guiding a pin passing through a respective movable contact, the movement of said pin being controlled by a link rod/crank assembly operated by said shaft actuating the single-pole isolating devices.

8. The apparatus according to claim 1, further comprising a system of levers, actuated by said shaft for actuating the vacuum circuit breaker modules, which operates movable contacts of the vacuum circuit-breaker module.

9. A cubicle of a medium or high voltage electric substation comprising:
    at least one three-pole apparatus;
    support guides configured to introduce, extract, or hold in position at least one three-pole apparatus,
        wherein the three-pole apparatus comprises:
            an air-insulated three-pole disconnector which is configured for performing functions of isolating the electric line leaving the cubicle;
            a three-pole circuit breaker which is configured for performing line protection functions;
            a casing comprising insulating material and which at least partially internally houses said three-pole circuit breaker;
        wherein the three-pole circuit breaker comprises three vacuum circuit-breaker modules and wherein the three-pole disconnector comprises three single-pole disconnector devices, each of the single-pole disconnector devices in turn comprising a contact movable linearly from a service position into a disconnection position;
        wherein each of the contacts, when it is in its service position, projects at least partially from the casing; and
        wherein the three-pole apparatus is configured for cooperating with an earthing switch which is not enclosed into said casing,
    wherein the cubicle also comprises a partition between voltage busbars and the three-pole apparatus, the partition having an opening through which the movable contacts of the three-pole disconnector can pass.

10. The cubicle according to claim 9, further comprising a separating shutter movable between a first open position where it allows the movable contacts of the three-pole disconnector to pass through and a second position where it closes the opening.

11. The cubicle according to claim 10, wherein movement of said separating shutter is dependent upon the position of the movable contacts of the three-pole disconnector.

12. The cubicle according to claim 9, wherein movement of said separating shutter is dependent on the presence or absence of a panel for closing said cubicle.

13. The cubicle according to claim 9, further comprising an earthing switch with an arm rotatable from a service position into an earthing position.

14. The cubicle according to claim 9, further comprising a shaped plate electrically insulated from the cubicle, said shaped plate being connected to user line cables and to clamping terminals electrically connected to the three-pole apparatus.

* * * * *